(12) United States Patent
Krasutsky et al.

(10) Patent No.: US 7,198,808 B2
(45) Date of Patent: Apr. 3, 2007

(54) PROCESS FOR EXTRACTING COMPOUNDS FROM PLANTS

(75) Inventors: Pavel A. Krasutsky, Duluth, MN (US); Vitaliy V. Nesterenko, Duluth, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 285 days.

(21) Appl. No.: 10/434,587

(22) Filed: May 9, 2003

(65) Prior Publication Data

US 2004/0009242 A1    Jan. 15, 2004

Related U.S. Application Data

(60) Division of application No. 10/053,237, filed on Jan. 17, 2002, now abandoned, which is a continuation-in-part of application No. 09/969,130, filed on Oct. 1, 2001, now abandoned.

(60) Provisional application No. 60/236,579, filed on Sep. 29, 2000.

(51) Int. Cl.
*A01N 65/00* (2006.01)
*A61K 31/34* (2006.01)
*A61K 31/56* (2006.01)

(52) U.S. Cl. ............... 424/769; 424/725; 514/169; 514/468

(58) Field of Classification Search .............. None
See application file for complete search history.

(56) References Cited

U.S. PATENT DOCUMENTS 3,932,533 A    1/1976  Isaac et al. ............... 260/617
3,983,147 A    9/1976  Senda et al. ............. 260/412.8
5,480,639 A    1/1996  Elsohly et al.
5,750,578 A    5/1998  Carlson et al. ............ 514/766
5,804,575 A    9/1998  Pezzuto et al. ............ 514/169
5,900,367 A    5/1999  Hong et al. ................. 435/123
6,124,362 A    9/2000  Bradbury et al.
6,369,101 B1    4/2002  Carlson
6,890,533 B2 *  5/2005  Bomshteyn et al. ...... 424/179.1

FOREIGN PATENT DOCUMENTS

| JP | 59-170088 | | 9/1984 |
| RU | 0382657 | | 5/1973 |
| RU | SU382567 A | | 10/1973 |
| RU | 2074867 | | 3/1997 |
| RU | 2080326 | * | 5/1997 |
| RU | 2131882 | | 6/1999 |
| RU | 2138508 | | 9/1999 |
| WO | WO-02/26343 | | 4/2002 |

OTHER PUBLICATIONS

Johnston, K. P., et al., "Supercritical Fluid Science and Technology", *ACS Symposium Series 406, American Chemistry Society*, Washington, D.C. Table of Contents, (1989).
McHugh, M., et al., "Supercritical Fluid Extraction", 2nd Edition. Butterworth-Heinemann, Boston. Table of Contents, (1994).
Nimitz, Jonathan S., "Experiments in Organic Chemistry: From Microscale to Macroscale", Englewood Cliffs, N.J.: Prentice Hall, Table of Contents, (1991).
Taylor, L. T., "Supercritical Fluid Extraction", John Wiley & Sons, New York. Table of Contents, (1996).
Chari, V. M., et al., "Chemical Components of Betula utilis & Celtis australis", *Indian Journal of Chemistry, 6 (5)*, (1968), 231-234.

* cited by examiner

*Primary Examiner*—Christopher R. Tate
(74) *Attorney, Agent, or Firm*—Schwegman, Lundberg, Woessner & Kluth P.A.

(57) ABSTRACT

The present invention provides a method for selectively extracting acidic and/or non-acidic compounds from natural material such as plant tissue.

34 Claims, 1 Drawing Sheet

PROCESS FOR EXTRACTING COMPOUNDS FROM PLANTS

CROSS-REFERENCE TO RELATED APPLICATION

This application is a divisional of U.S. patent application Ser. No. 10/053,237, filed Jan. 17, 2002, now abandoned which is a Continuation In Part application claiming benefit under 35 U.S.C. § 120 of U.S. application Ser. No. 09/969,130, filed Oct. 1, 2001, now abandoned which in turn claimed benefit under 35 U.S.C. 119(e) of U.S. Provisional Application Ser. No. 60/236,579 filed Sep. 29, 2000, all of which are incorporated herein by reference in their entirety.

BACKGROUND OF THE INVENTION

Many plants accumulate organic substances in quantities sufficient to be economically useful as chemical feedstocks or raw materials for various scientific, technological, and commercial applications. Economically useful organic substances serve as sources of industrial oils, resins, tannins, saponins, natural rubber, gums, waxes, dyes, pharmaceuticals, and many specialty products.

Plant chemicals are often classified as either primary or secondary metabolites. Primary plant metabolites are substances widely distributed in nature, occurring in one form or another in virtually all organisms. Secondary plant metabolites are compounds biosynthetically derived from primary metabolites and are more limited in distribution in the plant kingdom. Secondary metabolites are frequently accumulated by plants in smaller quantities than are primary metabolites.

Secondary plant metabolites present a broad range of medicinal properties. Many folk remedies are based on the isolation and purification of secondary metabolites from trees, shrubs, and flowers. Recently, some plant secondary metabolites have been found to exhibit cancer-inhibiting activity, or other activity related to inhibiting diseases. For example, camptothecin, colchicine, docetaxel, etopside, paclitaxel, podophyllotoxin, tetrahydrocannabinol, topotecan, vinblastine, vincristine, vindesine, betulinc acid, as well as others, have been found to have anticancer activity.

The use of secondary metabolites to treat diseases such as cancer or human immunovirus (HIV) has been impeded, in part, by the difficulty associated with synthesizing secondary plant metabolites, using conventionally industrial chemical techniques. Because secondary plant metabolites often have highly complex structures with many chiral centers that may impart biological activity, such complex compounds cannot by synthesized economically. As a result, there is a need for an inexpensive, efficient, bulk method for selectively extracting secondary metabolites from plants.

SUMMARY OF THE INVENTION

The present invention provides a method for selectively extracting compounds from plants in commercial (e.g., kg) quantities. The method includes contacting a mixture of a basic component and a first solvent with plant tissue, wherein the plant tissue is optionally contained in an extraction vessel. This contacting provides for the formation of salts with the acidic part of the plant tissue. This contacting between plant tissue and basic component can be mild enough to not cause any structural changes (by processes such as hydrolysis, oxidation, or isomerization) of the chemical sought to be extracted, or of other compounds present in plant tissue, other than removal of one or more protons from acidic compounds or protonated basic compounds. The contacting should result in ionic salts between the basic pretreatment component and acidic compounds of plant tissue. A second solvent can be contacted with the plant tissue to remove non-acidic compounds. A mixture of an acidic component and a third solvent can then be contacted with the plant issue to remove acidic compounds, thereby providing the acidic compounds. The contact between the mixture of the third solvent and acidic component with the plant tissue can also be mild enough to not cause any structural change of the acidic compound sought to be extracted, or of the compounds present in plant tissue, other than to protonate the basic compounds and the salts of acidic compounds.

The present invention provides for a method for selectively extracting one or more non-acidic compounds from plant tissue in the presence of one or more acidic compounds, comprising: (a) contacting a solution of a basic component and a first solvent with the plant tissue to immobilize the acidic compound on the plant tissue; and (b) contacting the plant tissue with a second solvent suitable to remove the non-acidic compounds to provide a solution comprising the non-acidic compounds. The resulting plant tissue can optionally be contacted with a solution of an acidic component and a third solvent to remove the acidic compounds from the plant tissue.

The present invention also provides for a method for selectively extracting one or more non-acidic compounds from plant tissue in the presence of one or more acidic compounds comprising: (a) contacting plant tissue with a solution of an aluminum alkoxide in a first solvent comprising xylene, thereby effectively immobilizing the one or more acidic compounds on the plant tissue; and (b) contacting the plant tissue with a second solvent suitable to remove the one or more non-acidic compounds, wherein the one or more non-acidic compounds comprises lupeol, betulin, taxol, paclitaxel, echinacea extract, valerian root extract, ginkgolide A, ginkgolide B, ginkgolide C, bilobalide, garlic extract, ginseng extract, aloe gel, barbaloin, cranberry extract, eleutheroside A, eleutheroside B, eleutheroside C, eleutheroside D, eleutheroside E, eleutheroside G, kava extract, dill seed oil, kola extract, quinoline alkoloids, or a combination thereof. The method can optionally include contacting the plant tissue with a solution of acetic acid and a third solvent comprising xylene, isopropanol, or a combination thereof, to effectively remove the one or more acidic compounds, wherein the one or more acidic compounds comprises betulin acid, betulin-3-caffeate, tannin, lipid, phenol, caffeic acid, cichoric acid, valerenic acid, isovaleric acid, flavonoid, quercetin, kaempferol, catechin, lignin, shikimic acid, succinic acid, amino acid, nicotinic acid, pantothenic acid, anthraquinone, acidic galactan, benzoic acid, quinic acid, malic acid, citric acid, hippuric acid, phenolic acid, ferulic acid, chlorogenic acid, norsolorinic acid, or a combination thereof.

The present invention also provides for a method for selectively extracting lupeol, betulin, or a combination thereof from birch bark in the presence of a mixture of acidic compounds comprising: (a) contacting the birch bark with a solution of an aluminum alkoxide in a first solvent comprising xylene, thereby effectively immobilizing the one or more acidic compounds on the birch bark; and (b) contacting the birch bark with a second solvent suitable to remove the lupeol, betulin, or a combination thereof. The method can optionally include contacting the plant tissue with a solution of acetic acid and a third solvent comprising xylene, isopropanol, or a combination thereof, to effectively remove the one or more acidic compounds, wherein the one or more acidic compounds comprises betulin acid, betulin-3-caffeate, or a combination thereof.

The present invention also provides for the one or more non-acidic compounds as described herein, as prepared by any one of the methods disclosed herein.

The present invention also provides for the one or more acidic compounds as described herein, as prepared by any one of the methods disclosed herein.

The present invention also provides for a composition of matter comprising the one or more acidic compounds described herein, as prepared by any one of the methods disclosed herein.

The present invention also provides for Taxol obtained by the process of contacting a solution of a basic component and a first solvent with *Taxus yunnanesis* bark to immobilize one or more acidic compounds on the *Taxus yunnanesis* bark and contacting the *Taxus yunnanesis* bark with a second solvent suitable to remove the taxol, thereby providing taxol comprising less than about 5 wt. % of tannins, fatty acids, phenols, or a combination thereof.

The present invention also provides for betulin, lupeol, or a combination thereof, obtained by the process of contacting a mixture of a basic component and a first solvent with birch bark to immobilize one or more acidic compounds on the birch bark; and contacting the birch bark with a second solvent suitable to remove the betulin, lupeol, or the combination thereof, thereby providing betulin, lupeol, or the combination thereof that comprises less than about 5 wt. % of betulinic acid, betulin-3-caffeate, or a combination thereof.

DETAILED DESCRIPTION OF THE INVENTION

Figure 1:
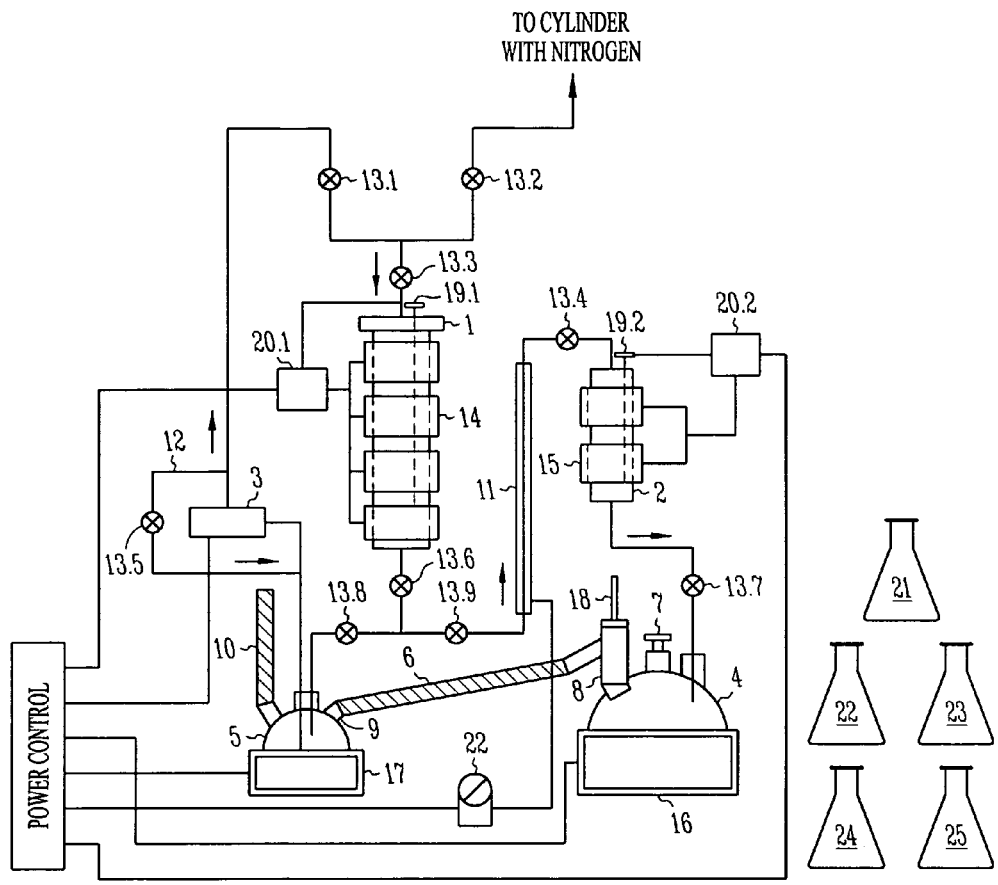
FIG. 1 depicts an exemplary apparatus for the use of selectively extracting compounds from natural materials, such as plant tissue.

All plant tissue includes both acidic and non-acidic compounds. This complicates extraction processes employed to isolate non-acidic compounds from acidic compounds of plant tissue. Therefore, the present extraction method can be employed for the selective extraction of a wide-range of plant materials. The present extraction procedure is therefore advantageous for many commercial industries, including, e.g., pharmaceutical, cosmetic, and nutraceutical industries. For example, undesirable acidic components may be present in natural extracts along with desirable non-acidic compounds. These acidic components may not only have little or no therapeutic utility, but many mammals (e.g., humans) may have adverse reactions to these undesirable acidic components. The acidic compounds, such as betulinic acid, may also be very desirable. The method of the present invention can be used to selectively extract non-acidic components from plant tissue, wherein the non-acidic compounds are essentially free of acidic compounds. The method of the present invention can also be used to selectively extract acidic compounds from plant tissue, wherein an acidic compounds are essentially free from the non-acidic compounds.

Plant Tissue

As used herein, "plant tissue" refers to the tissue of any organism of the plant kingdom, as opposed to one of the animal kingdom or of the kingdoms of Fungi, Protista, or Monera. The plant tissue can be any portion or portions of the plant (e.g., bark, roots, leaves, flowers, needles, bulbs, berries, rhizomes, rootstocks, stems, and seeds), as well as the entire plant. The tissues of a plant ("plant tissue") generally fall into three main categories: dermal tissue, ground tissue, and vascular tissue. Dennal tissue refers to the "skin" layer of all plant organs and is responsible for environmental interaction (light passage, gas exchange, pathogen recognition and protection, color display, etc.). Dennal tissue is composed of epidermal cells, closely packed cells that secrete a waxy cuticle that aids in the prevention of water loss. Ground tissue lies between dermal tissue and vascular tissue. The ground tissue comprises the bulk of the primary plant body. Parenchyma, collenchyma, and sclerenchyma cells are common in the ground tissue. In roots, the ground tissue may store sugars or starches to fuel the spring sap flow; in leaves, the ground tissue is the layer responsible for photosynthesis (the mesophyll). Vascular tissue transports food, water, hormones and minerals within the plant. Vascular tissue includes xylem, phloem, parenchyma, and cambium cells.

As used herein, "bark" refers to the dry, dead outer covering of woody branches, stems and roots of plants that is very distinct and separable from the wood itself. It includes all tissue outside the cambium (growth layer between bark and wood).

As used here the terms "leaf" or "leaves" refer to those parts of a plant which grow along the sides of branches or stems or at the bases of plants. Most are green and contain chlorophyll, though they vary in their shapes and sizes. Leaves are the part of the plant that ordinarily performs photosynthesis (the process that converts sunlight and carbon dioxide into energy).

As used herein, "needle" generally refers to a narrow stiff leaf, such as those of conifers (e.g., pine trees).

As used herein, "root" refers to the part of a plant, normally underground, that absorbs nutrients and anchors the plant into the ground.

As used herein, "bulb" refers to a spheroidal body growing from a plant either above or below the ground (usually below), which is usually a bud, consisting of a cluster of partially developed leaves, and producing, as it grows, a stem above, and roots below, (e.g., the onion or tulip bulb). A true bulb is a complete package containing next year's plant (flower) already forming inside. The contents of the bulb are often enclosed in protective, fleshy scales, which are held together by a small basal plate. The scales are modified leaves that contain enough nutrients to sustain the plant through dormancy and early growth. They may be loose and open like those of a lily, or tightly closed like those of a hyacinth. In many bulbs, a paper-thin tunic protects the scales (lilies don't have a tunic). Roots will grow from the bulb's basal plate.

As used herein, "berry" refers to any small fruit that is pulpy or succulent throughout, having seeds loosely imbedded in the pulp, such as the currant, grape, or blueberry. Berry can be further defined as an indehiscent fruit derived from a single ovary and having the whole wall fleshy, such as the grape or tomato. Furthermore, berries come in various structures including simple, such grape; blueberry, cranberry, or aggregate, such as blackberry; raspberry, strawberry mulberry.

As used herein, "rhizome" refers to a horizontal, usually underground stem that often sends out roots and shoots from its nodes (also called rootstalk or rootstock).

As used herein, "rootstock" refers to a robust plant that provides the root system in grafting, also known as a stock. Scions and buds are grafted and budded to a rootstock or stock. Rootstock also refers to the elongated and often thick rhizomes of certain perennial herbaceous plants such as the Iris, Aspidistra and Solomon's Seal.

As used herein, "stem" refers to the main (usually aerial) axis (sometimes referred to as the trunk or stalk) of a tree, shrub, or plant. "Stem" also refers to the part of the plant that supports the leaves, flowers or fruits of a plant, such as the peduncle of a fruit or the pedicel of a flower.

As used herein, "seed" refers to a ripened ovule, consisting of an embryo with one or more integuments, or coverings, such as an apple seed, a currant seed, dill seed, or kola nut seed. By germination, most seeds produces a new plant. "Seed" also refers to any small seedlike fruit, though it may consist of a pericarp, or even a calyx, as well as the seed proper, such as a parsnip seed or thistle seed. The seed proper has an outer and an inner coat, and within these the kernel or nucleus. The kernel is either the embryo alone, or the embryo enclosed in the albumen, which is the material for the nourishment of the developing embryo. The scar on a seed, left where the stem parted from it, is called the hilum, and the closed orifice of the ovule, the micropyle.

Plant

The plant can be a bryophyte or vascular plant. More specifically, the plant can be grass, flower or a tree and the plant tissue can be any part of the grass, flower or tree. Specific plants, flowers, and trees include, e.g., Moss (e.g., Club Moss), Horsetail, Fern, Conifer, Cycad, *Ginkgo biloba* (Ginkgo), *Taxus yunnanesis* (yew tree), *Echinacea* spp., *Valeriana officinalis*, *Allium sativum* (garlic), *Panax ginseng*, aloe vera, *Vaccinium macrocarpon*, *Eleutherococcus senticosus*, *Piper methysticum*, dill, kola nut, and cinchona.

Another specific plant is the birch tree, wherein the suitable plant tissue can be the bark of the birch tree. As used herein, "birch" or "birch tree" refers to any of the several deciduous tress of the genus *Betula*. The birches comprise the family Betulaceae in the order Fagales. Birch trees include, for example, white birch, *B. alba;* sweet, black or cherry birch, *B. lenta;* monarch birch, *B. maximowicziana;* dwarf or arctic birch; *B. nana;* Japanese white birch, *B. platphylajaponica;* smooth-bark birch, *B. pubescens;* yellow birch, *B. alleghaniensis;* paper, white or canoe birch, *B. papyrifera;* gray birch, *B. populifolia;* river birch, *B. nigra;* and the European birches, *B. pubescens;* *B. alba* and *B. pendula*. Specifically, birch can be *B. alba, B. lenta, B. maximowicziana, B. nana, B. platyphyla japonica, B. pubescens, B. alleghaniensis, B. papyrifera, B. populifolia, B. nigra* or *B. pendula*. A specific birch for use in the processes of the present invention is *B. papyrifera*.

As used herein, "*Taxus*" or "yew" refers to plants belonging to Taxaceae Gymnopenmae. There are 11 species and five sub-species of *Taxus* in the world, mainly found in East Asia, North America, and Europe;

"*Echinacea* spp." refers to a perennial native to North American which resembles a black-eyed Susan and is called *echinacea*, purple coneflower or snake root;

"*Valeriana officinalis*" or "valerian" refers to the plant *Valeriana officinalis* of the valerianaceae family, which is also known as valerian, phu, all-heal, great wild valerian, amantilla, setwall, setewale, capon's tail;

"*Allium sativum*" refers to garlic;

"*Panax ginseng*" refers to ginseng, commonly called Korean ginseng, Chinese ginseng or American ginseng. Asian ginseng is a member of the Araliaceae family, which also includes the closely related American ginseng, Panax quinquefolius, and less similar Siberian ginseng;

"*Eleutherococcus senticosus*," refers to "eleuthero" (which contains eleutheroside A, eleutheroside B (syringin), eleutheroside C, eleutheroside D, eleutheroside E (syringaresinol di-O-β-D-glucoside, liriodendrin), and eleutheroside G, among other constituents);

"Aloe" refers to any of the over 500 different species of Aloe. Aloe Vera is a member of the Lily family and is very-cactus like in its characteristics. This unique plant also belongs to a larger plant family called "Xeroids". Of the 500+species of Aloe, *Aloe barbadensis miller* (Aloe Vera species) is preferred;

"*Vaceinium macrocarpon*" refers to cranberry,

"*Piper methysticum*," a member of the pepper family, refers to a plant native to the South Sea Islands of Micronesia, Melanesia and Polynesia;

"*Kola vera*," of the family N.O. Sterculiaceae, also known as "Kola nut" refers to the tree that grows about 40 feet high and has yellow flowers spotted with purple; and "*Cinchona*," belongs to the family N.O. Rubiaceae and refers to Peruvian bark (*Cinchona succirubra*) which is an evergreen tree that grows 15 to 45 feet in height.

Plant Components (Non-acidic Compounds and Acidic Compounds)

The specific non-acidic compounds and acidic compounds that can be isolated from the plant tissue will depend, in part, upon the specific plant tissue that is being extracted. For example, the bark of *Taxus yunnanesis* can be extracted employing the methods described herein to provide taxol (paclitaxel) as the non-acidic compound and tannin, fatty acids, and phenols as the acidic compounds;

the needles of the Yew tree can be extracted employing the methods described herein to provide taxol (paclitaxel) as the non-acidic compound, and tannin, fatty acids, and phenols as the acidic compounds;

the root of the *Echinacea* spp. can be extracted employing the methods described herein to provide *Echinacea* extract as the non-acidic compound and tannin, caffeic acid, and cichoric acid as the acidic compounds;

the root of the *Valeriana officinalis* can be extracted employing the methods described herein to provide Valerian root extract as the non-acidic compound and valerenic acid, isovaleric acid, and tannins as the acidic compounds;

the roots, bark, leaves, or any combination thereof of the *Ginkgo biloba* can be extracted employing the methods described herein to provide Ginkgolide A, Ginkgolide B, Ginkgolide C, and bilobalide as the non-acidic compounds and tannins, flavonoids (e.g., quercetin, kaempferol, catechin), lignins, shikimic, and succinic acids as the acidic compounds;

the bulb of the *Allium sativum* can be extracted employing the methods described herein to provide garlic extract as the non-acidic compound and fatty acids and amino acids as the acidic compounds;

the root of the *Panax ginseng* can be extracted employing the methods described herein to provide Ginseng extract as the acidic compound and tannin, fatty acids, nicotinic acid and pantothenic acid as the acidic compound;

the leaves of the Aloe Vera can be extracted employing the methods described herein to provide aloe gel and barbaloin as the non-acidic compounds and fatty acids, anthraquinones, acidic gelactan, and amino acids as the acidic compounds;

the berries of the *Vaccinium macrocarpon* can be extracted employing the methods described herein to provide cranberry extract as the non-acidic compounds and benzoic acid, quinic acid, malic acid, citric acid, and hippuric acid as the acidic compounds;

the roots, rhizomes, stems, leaves, or combination thereof of the *Eleutherococcus senticosus* can be extracted employing the methods described herein to provide Eleutherosides A–G as the non acidic compounds and tannin, fatty acids, and caffeic acid as the acidic compounds;

the rootstock of the *Piper methysticum* can be extracted employing the methods described herein to provide Kava extract as the non-acidic compounds and tannin, fatty acids, and amino acids as the acidic compounds;

the seeds of the Dill can be extracted employing the methods described herein to provide seed oil as the non-acidic compound and phenolic acids (caffeic acid, ferulic acid, and chlorogenic acid) as the acidic compounds;

the seeds of the Kola nut can be extracted employing the methods described herein to provide kola extract as the non-acidic compounds and tannin and catechins as the acidic compounds; and the bark of the cinchona (yellow or red) can be extracted employing the methods described herein to provide quinolone alkaloids as the non-acidic compounds and norsoloric acid, tannins, and quinic acid as the acidic compounds.

TABLE 1

Non-acidic compounds and acidic compounds that can be isolated from specific plant tissue.

| Plant | Tissue | Components of Interest (non-acidic) | Acidic Components |
|---|---|---|---|
| *Taxus yunnanesis* | Bark | Taxol (paclitaxel) | Tannin, fatty acids, phenols |
| Yew tree | Needles | Taxol (paclitaxel) | Tannin, fatty acids, phenols |
| Echinacea spp. | Root | Echinacea extract | Tannin, caffeic, cichoric acid, tartaric acid & dicaffeate |
| *Valeriana officinalis* | Root | Valerian Roots extract | Valerenic acid, Isovaleric acid, tannins |
| *Ginkgo biloba* | Root bark and leaves | Ginkgolide A, B and C, bilobalide | Tannins, flavonoids (quercetin, kaempferol, catechin), lignins, shikimic and succinic acids |
| *Allium sativum* (garlic) | Bulb | Garlic extract | Fatty acids, amino acids |
| *Panax ginseng* | Root | Ginseng extract | Tannin, fatty acids, nicotinic acid, pantothenic acid |
| *Aloe Vera* | Leaves | Aloe gel, barbaloin | Fatty acids, anthraquinones, acidic galactan, amino acids |
| *Vaccinium macrocarpon* | Berry | Cranberry extract | benzoic, quinic, malic, citric and hippuric acid |
| *Eleutherococcus senticosus* | Root, rhizome, stems, leaves | Eleutherosides A-G | Tannin, fatty acids, caffeic acid |
| *Piper methysticum* | Rootstock | Kava extract | Tannin, fatty acids, amino acids |
| Dill | Seeds | Seed oil | Phenolic acids (caffeic, ferulic, chlorogenic) |

TABLE 1-continued

Non-acidic compounds and acidic compounds that can be isolated from specific plant tissue.

| Plant | Tissue | Components of Interest (non-acidic) | Acidic Components |
|---|---|---|---|
| Kola nut | Seeds | Kola extract | Tannin, catechins |
| Cinchona (red and yellow) | Bark | Quinoline alkaloids | Cinnamic acid, tannins, quinic acid |

"Paclitaxel" refers to [2aR-[2aα,4β,4aβ,6β,9α(αR*, βUS*),-11,α12α,12aα,12bα]]-β-(Benzoylamino)-α-hydroxybenzenepropanoic acid 6,12b-bis(acetyloxy)-12-(benzoyloxy)-2a,3,4,4a,5,6,9,10,11,12,12a,12b-dodecahydro-4,11,-dihydroxy-4a,8,13,13-tetramethyl-5-oxo-7,11-methano-1H-cyclodeca[3,4]benz[1,2-b]oxet-9-yl ester.

"*Echinacea* extract" is believed to include essential oil, polysaccharides, such as inulin, polyacetylenes, betain, glycoside, sesquiterpenes and caryophylene. *Echinacea* extract is also believed to contain copper, iron, tannins, protein, fatty acids, fat-soluble alkylamides, caffeic acid glycoside (echinacoside), and vitamins A, C, and E.

"*Valeriana officinalis* extract" is a very effective sedative and is used most often to help insomnia, especially due to stress. It has an advantage over prescription sedatives in that it is not habit forming. Valerian has many actions besides its well-known sedative effects. It strengthens the heart and in some cases lower blood pressure. It promotes wound healing and has some antibiotic activity and may be used externally to relieve muscle cramps. It has some expectorant activity and may help a tickly cough. It may actually balance the nervous system helping to calm agitated states and stimulate cases of extreme fatigue. There are several species of valerian, which vary in potency and can be used similarly, although *V. officinalis* is the preferred plant. Other constituents are a volatile oil, which includes isovalerianic acid and borneol; choline; flavonoids; sterols and several alkaloids, including actinidine, valerianine, valerine, and chatinine. Valepotriates are not water-soluble, but valeric acid is and may be the constituent most likely to produce valerian's sedative effect, especially when used as it was traditionally in water extracts (teas) or water/alcohol extracts (tinctures).

Many studies have provided clinical evidence that ginkgo prevents many problems throughout the entire body. Ginkgo is gaining recognition as a brain tonic that enhances memory because of its positive effects on the vascular system, especially in the cerebellum. It is also used as a treatment for vertigo, tinnitus (ringing in the ears) and a variety of neurological disorders and circulation problems. Ginkgo may help to counteract the effects of aging, including mental fatigue and lack of energy. Ginkgo has two groups of active substances, flavonoids (a three-ringed molecule with hydroxyl (OH) groups attached) and terpene lactones, including ginkgolides A, B, and C, bilobalide (a sesquiterpene), quercetin (a flavonoid), and kaempferol (a flavonoid). The constituents of gingko include terpenoids (bilobalide), diterpenoids (ginkgolide A, ginkgolide B, ginkgolide C, ginkgolide J, ginkgolide M), flavonoids: flavones (luteolin, tricetin, 2-hydroxyluteolin), biflavones (amentoflavone, ginkgetin, isoginkgetin, sciadoptysin, 5-methoxybilobetin, bilobetin), flavonols (caempherol, quercetin, isorhammetin), flavone glycosides, flavone acyl glycosides, catechins, and steroids (sitosterol, sitosterol glucoside). The ginkgolides have been shown to control allergic inflammation, anaphylactic shock and asthma. Ginkgo extract is generally derived from dried ginkgo leaves, but also may be derived from gingko root or bark.

"Garlic" contains compounds that are antibacterial, antifungal and reduce blood clotting. In order for the active ingredient that gives garlic its characteristic odor and its therapeutic effects to be released, the garlic clove (or bulb) must be cut or crushed. This releases an enzyme that causes the formation of allicin, the component responsible for garlic's odor and medicinal activity. Active constituents present in garlic include the sulphur compound allicin, produced by crushing or chewing fresh garlic, which in turn produces other sulphur compounds: ajoene, allyl sulfides, and vinyldithiins.

"Ginseng" is believed to increase energy, counter the effects of stress, and enhance intellectual and physical performance. Thirteen ginsenosides have been identified in ginseng, including ginsenosides Rg1 and Rb1. Other constituents include the panaxans, which are believed to help lower blood sugar, and the polysaccharides (complex sugar molecules), which are believed to support immune function. Also, long-term intake may be linked to a reduced risk of cancer.

Applied to wounds, "aloe" is a mild anesthetic, relieving itching, swelling, and pain: it also is antibacterial and antifungal, increases blood flow to wounded areas, and stimulates fibroblasts, the skin cells responsible for wound healing. "Cranberry" has astringent applications for the urinary tract and is a traditional remedy for bladder infections and kidney-related disorders. Two components of cranberry juice have been shown to inhibit the adherence of $E.\ coli$ to uroepithelial cells. The first is fructose. The second is proanthocyanidin, the chemical structure of which has been elucidated. Fructose inhibits the adherence of type-1 fimbriated $E.\ coli$ and proanthocyanidin inhibits the adherence of P-fimbriated $E.\ coli$ to uroepithelial cells. Cranberry is also a natural diuretic and urinary antiseptic agent.

Although "kava" has undergone much research as to its active ingredients, there is still no definite conclusion. It consists of an oleoresin from which kavalactones originate, starch, sugars, proteins, vitamins B1, B2, B3, B6, folic acid and E, potassium, manganese, biotin, choline, inositol, fat, glycyrrhizin, lecithin, pantothenic acid, para-aminobenzoic acid, pentacyclic terpenes, phosphorous, and a yellow dye. Kavalactones are considered the most active constituents in the plant. The main use for kava today is in the treatment of anxiety. It is also an excellent muscle relaxant and has diuretic and urinary antiseptic properties, so it may be useful in urinary cystitis and prostatitis. Kava also shows pain-relieving properties.

"*Kola vera*" or "*Cola vera*" seeds are said to contain a glucoside, Kolanin (this substance may be a mixture of Kola red and caffeine). The seeds also contain starch, fatty matter, sugar, and a fat decomposing enzyme acting on various oils.

"Dill seed" is an herbal medicine that is used to reduce gas, upset stomach, and colic pains. It is also used to promote the flow of milk in breastfeeding mothers, and to help control bad breath and hiccups. Other names for Dill Seed include: Anethum Graveolens, Dill, and Dillweed.

As used herein, "tannin" refers to tannic acid or gallotannic acid. Tannin varies somewhat in composition, depending on the source, having the approximate empirical formula $C_{76}H_{52}O_{46}$. Tannic acid is a colorless to pale yellow solid; it is believed to be a glucoside in which each of the five hydroxyl groups of the glucose molecule is esterified with a molecule of digallic acid. Tannin is used in tanning animal skins to make leather; it transforms certain proteins of animal tissue into compounds that resist decomposition. It is also used in manufacturing inks, as a mordant in dyeing, and in medicine as an astringent and for treatment of burns.

As used herein, "fatty acids" refers to a long-chain of carboxylic acids that may either be saturated (without double bond) or non-saturated (with double bond). It refers to any acid derived from fats by hydrolysis (e.g., oleic acid, palmitic acid, or stearic acid); any long-chain monobasic organic acid.

As used herein, "phenols" refers to compounds that include a $C_6H_5OH$ backbone. They are aromatic alcohols that are optionally substituted by one or more substituents. Phenols exhibits weak acidic properties and are sometimes called carbolic acids, especially when in water solution.

As used herein, "caffeic acid" refers to 3-(3,4-Dihydroxyphenyl)-2-propenoic acid.

As used herein, "valeric acid" refers to pentanoic acid; valerianic acid; and propylacetic acid.

As used herein, "isovaleric acid" refers to 3-Methylbutanoic acid and isovalerianic.

As used herein, "flavonoid" refers to polyphenols that have a carbon skeleton. They have an acidic nature due to the phenol groups.

As used herein, quercetin refers to 2-(3,4-Dihydroxyphenol)-3,5,7-trihydroxy-4H-1-benzopyran-4-one.

As used herein, "kaempferol" refers to 3,5,7-Trihydroxy-2-(4-hydroxyphenyl)-4H-1-benzopyran-4-one.

As used herein, "catechin" refers to (2R-trans)-2-(3,4-dihydroxyphenyl)-3,-4-dihydro-2H-1-benzopyran-3,5,7-triol.

As used herein, "lignin" refers to a highly polymerized and complex chemical compound especially common in woody plants. The cellulose walls of the wood become impregnated with lignin, a process called lignification, which greatly increases the strength and hardness of the cell and gives the necessary rigidity to the tree. It is essential to woody plants for them to stand erect.

As used herein, "amino acids" refers to any one of a class of simple organic compounds containing carbon, hydrogen, oxygen, nitrogen, and in certain cases sulfur. These compounds are the building blocks of proteins. They are characterized by the presence of a carboxyl group (COOH) and an amino group ($NH_2$). The 20 amino acids commonly found in animals are alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine. More than 100 less common amino acids also occur in biological systems, particularly in plants. Every amino acid except glycine can occur as either of two optically active stereoisomers, D or L; the more common isomer in nature is the L-form. When the carboxyl carbon atom of one amino acid covalently binds to the amino nitrogen atom of another amino acid with the release of a water molecule, a peptide bond is formed.

As used herein, "shikimic acid" refers to [3R-(3α,4α,5β]-3,4,5-Trihydroxy-1-cyclohexene-1-carboxylic acid.

As used herein, "succinic acid" refers to butanedoic acid ($HOOCCH_2CH_2COOH$).

As used herein, "nicotinic acid" refers to 3-Pyridinecarboxylic acid.

As used herein, "pantothenic acid" refers to (R)-N-(2,4-Dihydroxy-3,3-dimethyl-1-oxobutyl)-β-alanine.

As used herein, "anthraquinone" refers to 9,10-anthracenedione.

As used herein, "acidic galactan" refers to a poly sugar with attached carboxylic groups.

As used herein, "benzoic acid" refers to benzoic acid, $C_6H_5CO_2H$. It is the simplest aromatic carboxylic acid. In addition to being synthesized from a variety of organic compounds (e.g., benzyl alcohol, benzaldehyde, toluene, and phthalic acid), it may be obtained from resins, notably gum benzoin. It is used largely for making its salts and esters, most notably sodium benzoate, which is widely used as a preservative in foods and beverages and as a mild antiseptic in mouthwashes and toothpastes.

As used herein, "quinic acid" refers to [1R-(1α,3α,4α,5β]-1,3,4,5-Tetrahydroxycyclohexanecarboxylic acid.

As used herein, "malic acid" refers to hydroxybutanedioic acid.

As used herein, "citric acid" refers to citric acid or 2-hydroxy-1,2,3-propanetricarboxylic acid, $HO_2CCH_2C(OH)(CO_2H)CH_2CO_2H$, an organic carboxylic acid containing three carboxyl groups. It is responsible for the tart taste of various fruits in which it occurs, e.g., lemons, limes, oranges, pineapples, and gooseberries.

As used herein, "hippuric acid" refers to N-Benzoylglycine.

As used herein, "ferulic acid" refers to 3-(4-Hydroxy-3-methoxyphenyl)-2-propenoic acid.

As used herein, "chlorogenic acid" refers to [1S-(1α,3β,4α,5α]-3-[[3-(3,4-Dihydroxyphenyl)-1-oxo-2-propenyl]oxy]-1,4,5,trihydroxycyclohexanecarboxylic acid.

As used herein, "cinnamic acid" refers to 3-phenyl-2-propenoic acid.

Extraction Procedures

As used herein, "extraction" refers to a technique for separating a mixture of chemical components from plant tissue, wherein the components that are separated have different solubilities and adsorption strengths. A "solvent extraction" is a type of extraction wherein a mixture of components adsorbed on plant tissue are separated utilizing the differences in the solubilities and adsorption strengths of the components that are separated. Suitable extraction techniques are disclosed, e.g., in "Experiments in Organic Chemistry: From Microscale to Macroscale," Jonathan S. Nimitz (New York: Prentice Hall, 1990).

As used herein. "selective extraction" refers to the process of extracting a class of one or more compounds (e.g., one or more non-acidic compounds) from another class of one or more compounds (e.g., one or more acidic compounds).

As used herein, "acidic compound" in plant tissue refers to any compound naturally found in plant tissue that is acidic enough to form salts with the basic components upon treatment with the basic components. For instance, plant phenols, flavonoids, flavones, flavolonoles, and tannins are acidic enough to form salts that are immobilized on plant tissue by treatment with the basic components.

As used herein, an "acid" refers to any compound or mixture of compounds, in any suitable and effective amount, that can effectively lower the pH of a neutral solution to below 7.0. The acid will act as a proton donor and can neutralize a basic component or solution of basic components, thereby forming a salt and water. Any suitable acid can be employed, provided the acid effectively neutralizes the one or more salts, which are formed after the plant tissue immobilization. The suitable acid may be an inorganic acid (e.g., hydrochloric acid, hydrobromic acid, sulfuric acid, phosphoric acid, or a combination thereof); an organic acid (e.g., acetic acid, formic acid, or a combination thereof); or a combination of an inorganic acid and an organic acid.

As used herein, a "basic component" refers to any compound or mixture of compounds, in any suitable and effective amount, that can effectively form non-soluble salts with the one or more acidic compounds and effectively immobilizes the one or more acidic compounds on the plant tissue. The basic component will act as a proton acceptor. Any suitable basic component can be employed, provided the basic component effectively forms non-soluble salts with the one or more acidic compounds and effectively immobilizes the one or more acidic compounds on the plant tissue. One suitable class of basic components that effectively forms non-soluble salts with the one or more acidic compounds and effectively immobilizes the one or more acidic compounds on the plant tissue are the alcoholates.

As used herein, an "alcoholate" or "alkoxide" refers to a base formed from an alcohol in which the hydroxyl hydrogen atom has been replaced by a metal atom (e.g., sodium, lithium, potassium, calcium, or aluminum). One suitable alcoholate includes the aluminum alcoholates.

As used herein, an "aluminum alcoholate" refers to an alcoholate or alkoxide in which the metal atom is aluminum. Suitable aluminum alcoholates include compounds of the formula $Al(OR)_3$, wherein each R is independently $(C_1-C_{12})$alkyl, aryl (e.g., phenyl), or arylalkyl (e.g., benzyl), wherein each alkyl, aryl, or arylalkyl can be optionally substituted on carbon with one or more hydroxy, halo, or $-N(R_b)_2$. Each $R^b$ can independently be H, $(C_1-C_6)$alkyl, aryl (e.g., phenyl), or arylalkyl (e.g., benzyl). Suitable specific aluminum alcoholates include, e.g., aluminum isopropoxide [Al(i-OPr)$_3$], aluminum ethoxide [Al(OEt)$_3$], and aluminum methoxide [Al(OMe)$_3$].

As used herein, "alkyl" can be straight-chain or branched.

Other suitable alcoholates include sodium alcoholates (NaOR), lithium alcoholates (LiOR), potassium alcoholates (KOR), magnesium alcoholates [Mg(OR)$_2$], calcium alcoholates [Ca(OR)$_2$], and germanium alcoholates [Ge(OR)$_3$]; wherein each R is independently $(C_1-C_{12})$alkyl, aryl (e.g., phenyl), or arylalkyl (e.g., benzyl), wherein each alkyl, aryl, or arylalkyl can be optionally substituted on carbon with one or more hydroxy, halo, or $-N(R_b)_2$. $R_b$ is H, $(C_1-C_6)$alkyl, aryl (e.g., phenyl), or arylalkyl (e.g., benzyl). Specific examples of alcoholates include sodium methoxide, sodium ethoxide, potassium ethoxide, potassium tert-butoxide, and dimethoxymagnesium.

Another suitable class of basic components includes amines. As used herein, "amines" includes ammonia, as well as primary (NH$_2$R), secondary (NHR$_2$), and tertiary (NR$_3$) amines. Each R can independently be $(C_1-C_{12})$alkyl, aryl (e.g., phenyl), or arylalkyl (e.g., benzyl); wherein each alkyl, aryl, or arylalkyl can be optionally substituted on carbon with one or more hydroxy, halo, or $-N(R_b)_2$. Each $R_b$ can independently be H, $(C_1-C_6)$alkyl, aryl, or arylalkyl. Specific examples of amines are ammonia, triethylamine, trimethylamine, $N(CH_2CH_2OH)_3$, and $(HOCH_2)_3CNH_2$.

Another suitable class of basic components includes heterocycles. As used herein, "heterocycle" refers to an aromatic or non-aromatic compound that contains in the ring at least one basic nitrogen atom. A heterocyclic ring system can be simple, ortho-fused, or bicyclic. The ring system can optionally comprise one or more non-peroxide oxygen or sulfur. Examples of heterocycles include pyridine, morpholine, piperidine, N-methylpiperidine, pyrrole, pyrrolidine, azabicyclo[2.2.2]octane, and diazabicyclo[2.2.2]octane. The heterocycle ring system can optionally be substituted on carbon with one or more oxo, hydroxy, amino, sulfo, $(C_1-C_4)$alkyl, $(C_1-C_4)$hydroxyalkyl, or $-N(R_b)_2$, wherein $R_b$ is H or $(C_1–C_4)$alkyl; or on nitrogen with one or more $(C_1–C_4)$alkyl or $(C_1–C_4)$hydroxyalkyl.

As used herein, "hydroxyalkyl" can be straight-chain or branched, and the hydroxy group can be on any suitable carbon atom.

Another suitable class of basic components includes alkaline earth metal hydroxides. These comprise an alkaline earth cation and one or more hydroxide ions. Examples of alkaline earth metal hydroxides include NaOH, KOH, LiOH, $Mg(OH)_2$, and $Ca(OH)_2$.

Another suitable class of basic components includes alkaline earth metal oxides. These compounds consist of one or more alkaline earth metals and oxygen. Examples of basic oxides include $K_2O$, $Na_2O$, $Li_2O$, KNaO, CaO, and MgO.

Another suitable class of basic components includes alkaline earth metal carbonates and bicarbonates. The compounds consist of $CO_3^{2-}$ or $HCO_3^-$ and alkaline earth metal cations. Examples of alkaline earth metal carbonates and bicarbonates include $Na_2CO_3$, $NaHCO_3$, $K_2CO_3$, $KHCO_3$, $KNaCO_3$, $Li_2CO_3$, $LiHCO_3$, $CaCO_3$, and $MgCO_3$.

Another suitable class of basic components includes alkaline earth metal sulfites. These compounds consist of sulfite anion and alkaline earth metal cations. Examples of alkaline earth metal sulfites include $Na_2SO_3$, $K_2SO_3$, $KNaSO_3$, $Li_2SO_3$, $CaSO_3$, and $MgSO_3$.

Another suitable class of basic components includes alkaline earth metal sulfides. These compound consist of $S^{2-}$ and alkaline earth metal cations. Examples of alkaline earth metal sulfides include $Li_2S$, $K_2S$, and $Na_2S$.

Another suitable class of basic components includes alkaline earth metal hydrogen sulfides. These compounds consist of $HS^-$ and an alkaline earth metal cation. Examples of alkaline earth metal hydrogen sulfides include LiHS, KHS, and NaHS.

The basic component can also be generated in a mixture from compounds that generate a basic component. Examples of compounds that can generate basic components would be elemental sodium, elemental magnesium, elemental potassium, and elemental calcium. Each of these compounds in contact with water or alcohols will generate the corresponding alkline earth metal hydroxide or alkaline earth metal alcoholate.

Suitable basic components are commercially available from, e.g., Aldrich (Milwaukee, Wis.)

The first solvent can effectively dissolve the basic component but will not effectively dissolve the salts that are formed in the process of the neutralization of acidic compounds. Any suitable solvent can be employed as the first solvent, provided the solvent effectively dissolves the basic component but does not effectively dissolve the salts that are formed in the process of the neutralization of acidic compounds. The first solvent can include any suitable: (1) optionally substituted aromatic compound, (2) optionally substituted heterocyclic compound, (3) optionally substituted cyclic compound, (4) optionally substituted linear or branched compound, (5) or any combination thereof. Suitable substituents include, e.g., $(C_1–C_6)$alkyl, hydroxyl, halo, trihalo$(C_1–C_6)$alkyl, cyano, nitro, oxo, thioxo, amino, carboxyl, and combinations thereof. Compounds suitable as a first solvent are disclosed and commercially available from, e.g., 2001 Aldrich Catalogue (Milwaukee, Wis.). Specific compounds suitable as a first solvent include isopropanol, ethanol, methanol, methylene chloride, toluene, xylene (e.g., o-xylene, m-xylene, or p-xylene), carbon dioxide, or combinations thereof. Other compounds suitable as a first solvent include Xe, Freon-23, ethane, $N_2O$, $SF_6$, propane, ammonia, n-$C_4H_{10}$, $(C_2H_5)_2O$, and combinations thereof.

The first solvent can include a single compound or can include a mixture of compounds. In addition, the first solvent can optionally include an additive.

The concentration of the basic component in the first solvent can vary depending on the carrying capacity of the solvent for the basic component. Any suitable solvent can be employed that allows for efficient reaction between the basic component and acidic compounds in the plant tissue. Typically, the concentration can be about 0.1 to 25 percent basic component in the solvent by weight. Specifically, the concentration can be about 0.5 percent to 10 percent base in the solvent by weight. More specifically, the concentration can be about 1 percent to 5 percent base in the solvent by weight.

By treating the plant tissue with a mixture of a basic component in a first solvent, acidic compounds in the plant tissue will form salts. The resulting salts can precipitate on the plant tissue, or otherwise adhere to the plant tissue, so that non-acidic compounds can be selectively removed from the plant tissue. Discharging the mixture of the basic component in the first solvent from the extraction vessel and introducing a second solvent can accomplish this. The excess basic component can be adsorbed by any suitable adsorbent (e.g., silica, alumina, or a combination thereof).

The second solvent can effectively dissolve the one or more non-acidic compounds but will not effectively dissolve the salts of the one or more acidic compounds that were effectively formed during the treatment with the basic component. The second solvent can include any suitable: (1) optionally substituted aromatic compound, (2) optionally substituted heterocyclic compound, (3) optionally substituted cyclic compound, (4) optionally substituted linear or branched compound, (5) or any combination thereof. Suitable substituents include, e.g., $(C_1–C_6)$alkyl, hydroxyl, halo, trihalo$(C_1–C_6)$alkyl, cyano, nitro, oxo, thioxo, amino, carboxyl, and combinations thereof. Compounds suitable as a second solvent are disclosed and commercially available from, e.g., 2001 Aldrich Catalogue (Milwaukee, Wis.). Specific compounds suitable as a second solvent include isopropanol, ethanol, methanol, methylene chloride, toluene, xylene (e.g., o-xylene, m-xylene, or p-xylene), carbon dioxide, or combinations thereof. Other compounds suitable as a second solvent include Xe, Freon-23, ethane, $N_2O$, $SF_6$, propane, ammonia, n-$C_4H_{10}$, $(C_2H_5)_2O$, and combinations thereof.

The second solvent can include a single compound or can include a mixture of compounds. In addition, the second solvent can optionally include an additive. The second solvent can be passed through the vessel to remove non-acidic compounds from the plant tissue in one pass or in multiple passes. Optionally, the second solvent can be recirculated through the vessel using the reservoir optionally attached to the vessel. Non-acidic compounds can be extracted from the plant tissue using temperature, pressure, and time parameters that are sufficient to remove a significant amount (e.g., more than about fifty percent, more than about seventy percent, or more than about ninety percent) of non-acidic compounds can be removed from the plant tissue. An optional additional vessel can be employed for the adsorption of any excess basic material and some polymeric non-acidic compounds.

The third solvent can effectively neutralize the basic salts that are formed during the treatment of plant tissue with the basic components. This process releases acidic compounds for further extraction with the third solvent. The third solvent can include any suitable: (1) optionally substituted aromatic compound, (2) optionally substituted heterocyclic compound, (3) optionally substituted cyclic compound, (4)

optionally substituted linear or branched compound, (5) or any combination thereof. Suitable substituents include, e.g., ($C_1$–$C_6$)alkyl, hydroxyl, halo, trihalo($C_1$–$C_6$)alkyl, cyano, nitro, oxo, thioxo, amino, carboxyl, and combinations thereof. Compounds suitable as a third solvent are disclosed and commercially available from, e.g., 2001 Aldrich Catalogue (Milwaukee, Wis.). Specific compounds suitable as a third solvent include isopropanol, ethanol, methanol, methylene chloride, toluene, xylene (e.g., o-xylene, m-xylene, or p-xylene), carbon dioxide, or combinations thereof. Other compounds suitable as a third solvent include Xe, Freon-23, ethane, $N_2O$, $SF_6$, propane, ammonia, n-$C_4H_{10}$, $(C_2H_5)_2O$, and combinations thereof. The third solvent can include a single compound or can include a mixture of compounds. In addition, the third solvent can optionally include an additive.

The solution of the acid in the third solvent can be passed through the vessel in one pass or in multiple passes using temperature, pressure, and time parameters that are sufficient to remove a significant amount (e.g., more than about fifty percent, more than about seventy percent, or more than ninety percent) of acidic compounds from the plant tissue.

As used herein, an "additive" is a compound added to the solvent in an amount of about 1 wt % to about 20 wt. % based on the solvent. Specifically, the additive may be present in an amount of about 1 wt. % to about 15 wt. % or about 1 wt. % to about 10 wt. %. Upon addition, the additive will modify the physical properties of the solvent. For example, an additive may be useful to modify the polarity, critical temperature, critical pressure, etc., of the solvent system. Suitable additives include lower alcohols (e.g., methanol, ethanol, 1-propanol, 2-propanol, 1-hexanol, or 2-methoxy ethanol); ethers (e.g., tetrahydrofuran or 1,4-dioxane); substituted hydrocarbons (e.g., acetonitrile, dichloromethane, ammonia or chloroform) propylene carbonate, N,N-dimethylacetamide; dimethyl sulfoxide; carboxylic acids (e.g., formic acid); water; carbon disulfide; lower ketones (e.g., acetone), hydrocarbons (e.g., propane, toluene, hexanes and pentanes); as well as optionally substituted aromatic compounds (e.g., o-xylene, m-xylene, p-xylene, and toluene).

As used herein, "fragmentation" includes chopping, crunching, crushing, gnashing or pounding. Such fragmentation of plant tissue will effectively provide smaller pieces of plant tissue. The smaller pieces of plant tissue will have, combined, a larger surface area. The fragmentation can conveniently be carried out, e.g., by introducing plant tissue into a machine with knives on a rotating disk (e.g., a chipper or shredder). One chipper suitable for fragmenting the plant tissue is the YardMan Model 246-648D401 chipper.

As used herein, "pelletization" refers to the process of forming plant tissue pellets. Any suitable pelletization method known to those of skill in the art can be employed. For example, fragmented plant tissue can be sprayed with a solvent (e.g., water) through a sprinkler in a horizontal mixer. Pelletization can routinely be performed using, e.g., a Laboratory Pellet Machine (California Pellet Mill, Co., CA) through a die with holes. Pelletization increases the density of plant tissue. This increases the efficiency of the extraction process, decreases the extractors' volume and decreases the amount of solvents needed for extraction. In addition, plant tissue pellets are relatively easy to handle. For example, there are little or no problems associated with dust or filtration.

As used herein, "drying" refers to the process of removing a substantial amount (e.g., up to about 50%, up to about 75%, or up to about 90%) of liquid or moisture in the plant tissue. In an alternative embodiment, the drying process can remove up to about 95%, up to about 99%, or up to about 100% of liquid or moisture in the plant tissue. The liquid or moisture can typically include water. As such, the drying will effectively remove at least a portion of water present in the plant tissue. Prior to or subsequent to fragmentation, plant tissue can be dried. Such drying may increase the efficiency of the fragmentation, which can increase the efficiency of the extraction. The plant tissue can be air-dried or dried at an elevated temperature with or without reduced pressure (i.e., in vacuo). Typically, the drying temperature employed is any suitable elevated temperature that will not lead to degradation or decomposition of the plant tissue or the components therein. Specifically, plant tissue can be dried in vacuo at an elevated temperature. Machines capable of drying plant tissue are known in the art and include an oven, or similar device, such as a rotating air drum drier. The plant tissue can be dried at any suitable temperature. For example, the plant tissue can be dried above about 25° C., above about 50° C., or above about 100° C. Additionally, the plant tissue can be dried for any suitable period of time. For example, the plant tissue can be dried for more than about 10 minutes, for more than about 1 hour, or for more than about 24 hours. Additionally, any suitable pressure can be employed that does not lead to decomposition or degradation of the plant tissue. The drying pressure typically can be from about 0.1 atmosphere to 2.5 atmospheres. Specifically, the drying pressure can be from about 0.1 atmosphere to 1.0 atmosphere. More specifically, the drying pressure can be from about 0.1 atmosphere to 0.75 atmosphere.

After the fragmented plant tissue is optionally dried and optionally pelletized, it typically can be placed in an extraction vessel to be extracted. Any suitable extraction vessel can be employed. The extraction vessel will preferably be equipped with inlets and outlets that can be opened and closed. The vessel will optionally be capable of being heated and/or pressurized. For smaller scale extractions, the vessel can be, e.g., a soxhlet apparatus. For commercial scale (e.g., kilogram) extractions, the extraction vessel can be a stainless steel tube or similar chamber, optionally attached to a solvent reservoir. Additionally, commercial scale (e.g., kilogram) extractions, the extraction vessel can be a vessel capable of supercritical fluid extraction (SFE).

The plant tissue can be packed to fill the capacity (or some fraction thereof) of the extraction vessel. The extent to which the extraction vessel can be filled with the packed, fragmented plant tissue will vary depending upon the dimensions of the extraction vessel, the plant tissue, and the density to which the plant tissue can be packed. The fragmented plant tissue typically can be packed to any suitable density depending upon the extraction vessel and the scale of the extraction. Preferably, the plant tissue can be packed to a density of about 0.1 g/cm$^3$ to about 1 g/cm$_3$. More preferably, the fragmented plant tissue can be packed to a density of about 0.25 g/cm$_3$ to about 0.85 g/cm$_3$ in the extraction vessel. More preferably, the fragmented plant tissue can be packed to a density of about 0.5 g/cm$^3$ to about 0.75 g/cm$^3$. However, the optimal extent to which the extraction vessel can be packed with plant tissue and the density to which the plant tissue can be packed can be easily determined by practitioners in the art. Additionally, the extraction vessel can be filled up to about 99% of the volume, up to 90% of the volume, or up to about 80% of the volume.

Supercritical Fluid Extraction (SFE)

The second extraction solvent, the third extraction solvent, or combination thereof, can employ supercritical fluid extraction.

Supercritical fluid extraction is an extraction wherein a fluid at a temperature and pressure above its critical point is employed; or a fluid above its critical temperature, regardless of pressure, is employed. Below the critical point, the fluid can coexist in both gas and liquid phases, but above the critical point there is only one phase. Equipment and techniques for carrying out supercritical fluid extraction are known to those skilled in the art. See, McHugh, M. And Krukonis, V., *Supercritical Fluid Extraction,* 2nd ed, Butterworth-Heinemann, Boston, 1994; Johnston, K. P., Penninger, J. M. L., *Supercritical Fluid Science and Technology,* ACS Symposium Series 406, American Chemical Society, Washington, D.C.; and Taylor, L. T., *Supercritical Fluid Extraction,* John Wiley & Sons, New York, 1996.

In a supercritical fluid extraction, thermodynamic and transport properties of supercritical fluid are a function of density, which depends strongly on the fluid's pressure and temperature. The density may be adjusted from a gas-like value of 0.1 g/ml to a liquid-like value as high as 1.2 g/ml. Furthermore, as conditions approach the critical point, the effect of temperature and pressure on density becomes much more significant. For example, increasing the density of supercritical carbon dioxide from 0.2 to 0.5 g/ml requires raising the pressure from 85 atm to 140 atm (8.6 megapascals to 14.2 megapascals) at 158° F. (70° C.), but at 95° F. (35° C.) the required change is only from 65 atm to 80 atm (6.61 Mpa to 8.1 Mpa).

As used herein, "fractional supercritical fluid extraction" (hereinafter "FSCFE") is a multi-step procedure wherein the supercritical fluid extraction is carried out at one temperature and pressure for a given period of time and is then carried out at one or more other temperatures or pressures.

The efficiency of supercritical fluid extraction on a material such as outer birch bark depends in part upon the size of the outer birch bark pieces. Thus, the smaller the outer birch bark pieces, the more efficient the supercritical fluid extraction typically will be. As such, after fragmentation and prior to extraction, outer birch bark shreds may be further reduced in size with a Hammermill or suitable means. For example, a 15 horsepower 3B Junior Hammermill made by Jay Bee Manufacturing, Inc can be used as illustrated in the Examples herein below. The hammermill reduces large pieces of birch bark by beating the bark with pivoted hammers until the material is small enough to fall through a mesh.

For use in the processes of the present invention, the size of outer birch bark shreds obtained after the Hammermill reduction is typically less than about 5 mm in diameter. Specifically, the shreds can be less than about 3 mm in diameter. More specifically, the shreds can be less than about 1 mm in diameter.

For use in the processes of the present invention, supercritical fluid extraction can conveniently be carried out at a pressure of about 1,000 psi to about 12,000 psi. It is appreciated that those skilled in the art understand that higher pressures may enable faster extraction. In this case, it may be necessary to subsequently separate and purify the product.

For use in the processes of the present invention, supercritical fluid extraction can conveniently be carried out at a pressure of about 750 psi to about 12,000 psi. Specifically, the pressure may be about 1,000 psi to about 10,000 psi. More specifically, the pressure may be about 4,000 psi to about 9,000 psi.

For use in the processes of the present invention, the temperature of supercritical fluid extraction can conveniently be about 0° C. to about 150° C. Specifically, the temperature can be about 25° C. to about 110° C. More specifically, the temperature can be about 45° C. to about 100° C.

In one specific embodiment, supercritical fluid extraction is performed at a temperature of about 40° C. to about 90° C. and a pressure of about 3,000 psi to about 10,000 psi.

Supercritical fluid extraction employs a solvent which possesses physical properties suitable as a supercritical fluid. Suitable solvents include carbon dioxide, Xe, Freon-23, ethane, $N_2O$, $SF_6$, propane, ammonia, $n-C_4H_{10}$, $(C_2H_5)_2O$ and the like.

The physical and environmentally friendly properties of carbon dioxide make it particularly attractive as a solvent for supercritical fluid extraction. Carbon dioxide is a major component of the atmosphere and is therefore relatively safe and abundant. In addition, carbon dioxide is relatively inexpensive. Compared to most other suitable solvents, carbon dioxide is environmentally friendly as it will not harm the atmosphere at the quantities used in the methods of the invention. Moreover, carbon dioxide is non-flammable and non-explosive. Further, carbon dioxide leaves no substantial residue or remnant upon evaporation.

Carbon dioxide also possesses physical properties which enable it to change polarity over the temperature range and pressure range normally employed in supercritical fluid extraction. As a result, carbon dioxide may act as a nonpolar solvent at one temperature and pressure but may act as a polar solvent at another temperature and pressure. By varying the temperature and pressure, the solvent properties may be modified. This allows for the isolation of more than one compound using a single solvent system.

The solvent employed in supercritical fluid extraction may be a single compound or may be a mixture of compounds. In addition, the solvent may include an additive.

The non-acidic extract (i.e., the non-acidic compounds) will include relatively little or no acidic compounds therein. Typically, the non-acidic extract will include less than about 25 wt. % acidic compounds, less than about 10 wt. % acidic compounds, less than about 5 wt. % acidic compounds, or less than about 1 wt. % acidic compounds.

The collected non-acidic extract can be purified by methods known in the art such as, e.g., crystallization, chromatography, distillation, or a combination thereof. See in "Experiments in Organic Chemistry: From Microscale to Macroscale," Jonathan S. Nimitz (New York: Prentice Hall, 1990).

An optional adsorption process can be employed in the method of the present invention. Without an adsorption process, birch bark can be extracted employing the extraction procedures disclosed herein to provide a betulin fraction may have a tan appearance. The color is probably caused by aligomeric tannin admixtures, which are not acidic enough to be bound by $Al(i-OPr)_3$ in the extraction vessel. To adsorb the color causing compounds, adsorbents such as silica, aluminum oxide, calcium carbonate, calcium oxide, molecular sieves, ionic exchange resins, amberlite, sephadex, sephacryl, polymeric adsorbents (diaion, ambersorb), cellulose, hydroapatite, and/or activated charcoal may be employed. Preferably, the adsorbent for decoloration can be $Al_2O_3$.

After the non-acidic compounds are removed from the plant tissue, the acidic compounds, which underwent reaction with the basic component to form salts, can optionally be removed. Discharging the second solvent from the vessel and introducing a mixture of an acid in a third solvent can accomplish this.

The acidic extract (i.e., the acidic compounds) will include relatively little or no non-acidic compounds therein. Typically, the acidic extract will include less than about 25 wt. % non-acidic compounds, less than about 10 wt. % non-acidic compounds, less than about 5 wt. % non-acidic compounds, or less than about 1 wt. % non-acidic compounds.

The resulting acidic extract can be purified by methods known in the art such as, e.g., crystallization, chromatography, distillation, or a combination thereof. See "Experiments in Organic Chemistry: From Microscale to Macroscale," Jonathan S. Nimitz (New York: Prentice Hall, 1990).

The invention is further demonstrated in the following example. The example is for purposes of illustration and is not intended to limit the scope of the present invention.

EXAMPLE 1

Selective Low-high Pressure Extraction of Pretreated Outer Birch Bark Pellets in a 3-Liter-extraction Vessel Introduction A method for selectively isolating compounds from plant tissue, such as birch bark, includes the pretreatment of the plant tissue, e.g., birch bark, selective extraction of the pretreated tissue, and the isolation and purification of non-acidic and acidic compounds, such as birch bark triterpenes, which include betulin (a), lupeol (b), betulinic acid (c) and betulin-3-caffeate (d).

Birch bark extraction was performed using an apparatus (FIG. 1) purchased from Newport Scientific, Inc. (model: 46-19360-50 Hz). The apparatus can be used for low and high-pressure operations (up to 10,000.00 psi or 680 atm). The low-pressure pump (3) (KNF Flodos, Co., CH-6210 Sursee) and distillation/recycling assembly (4, 5, 6, 8, 9 and 10) are additional units for the apparatus. The apparatus may be used with organic solvents, such as i-propanol, ethanol, methylene chloride, toluene, and o-, p- and m-xylene, at temperatures from about 50° C. to 200° C., as well as $CO_2$ supercritical extraction conditions. For $CO_2$ supercritical extraction, it is necessary to use the diaphragm type compressor, which may compress supercritical fluids, gas or liquid, to 10,000 psi.

To extract and selectively isolate non-acidic and/or acidic compounds from birch bark, the bark was first, shredded, ground, screened and pelletized (cylinder shaped pellets, b×h=1 mm×1 mm) as described in WO 01 108885. The average density of the pellets was about 0.5 to 0.6 g/ml. The pellets were dried in a drying hood at about 100° C. for about 10 hours before loading into an extraction vessel.

Step 1: Birch Bark Pellet Pretreatment Process

Approximately 1.2 kg of dry birch bark pellets were placed/loaded in a 20 L Rotor Evaporator (Buchi Rotavapor R-153). Approximately 60 g (1.5%) of Al(O-i-Pr)$_3$ in 4 L of p-xylene was added to a rotating vessel of the rotor evaporator at room temperature. The birch bark pellets and Al(O-i-Pr)$_3$ in p-xylene were rotated in the rotator vessel under normal pressure at 70° C. for about 2 hours. After 2 hours, the p-xylene was evaporated at p=30–40 mm at a temperature of about 60–70° C. Following evaporation, 1 L of p-xylene was added into the rotor evaporator. This additional solvent was evaporated at p=30–40 mm at a temperature of about 60–70° C. The additional solvent and evaporation allowed for the release of birch bark pellets from undesirable admixtures of i-propanol (see Equation 1 below). As a result of the pretreatment process, the majority of acidic compounds present in the birch bark were bound in non-soluble aluminum salts as demonstrated in Equation 1. Alcohols, such as betulin and lupeol, are not acidic enough to be bound with Al(O-i-Pr)$_3$. The birch bark pellets maintained their cylinder/pellet form (b×h=1 mm×1 mm) throughout the pretreatment process.

XH+Al(i-OPr)$_3$→X-OAl(i-OPr)$_2$+i-PrOH    Equation 1

XH—the acidic component of natural material

Step 2: The Process of Selective Extraction

After pretreatment, the pellets, about 1260 g, were loaded into an extraction vessel for the selection extraction process. The apparatus, including the parts listed in Table I, were assembled as shown in FIG. 1. The extraction system consisted of three major blocks: (1) the extraction vessel assembly; (2) the adsorption vessel assembly; and (4) the solvent regeneration assembly. The extraction vessel assembly (1) and adsorption vessel assembly (2) may maintain the pressure up to 10,000.00 psi (680 atm.). Such pressure levels may be used for $CO_2$ supercritical extraction. The extraction vessel (EV) (1) was equipped with a thermocouple (19.1), thermocouple temperature controller (20.1), regulating valves (13.3, 13.6) and heaters (14). The EV (1) was connected to the adsorption vessel (2) by stainless steel tubing, which was heated by heating tape (11). The adsorption vessel (2) was also equipped with a thermocouple (19.2), thermocouple temperature controller (20.2), regulating valves (13.4, 13.7) and adsorption vessel heaters (15). The adsorption vessel (2) was connected to the distilling flask (4) through a valve (13). The distilling flask (4) was equipped with a Wurtz adapter (8), thermometer (18) and stopper (7). The horizontal large condenser (6) was attached to adapter (8) and adapter (9). Adapter (9) was connected to the receiving flask (5). The pump (3) was attached through a coupling joint and PE tubing with a receiving flask (5). The pump assembly was equipped with a back loop system (12). A nitrogen tank was attached to a regulating valve (13.2).

TABLE 2

The list of equipment for pretreated birch bark pellets extraction

| No. | Name of Equipment | Quantity |
|---|---|---|
| 1 | Extraction vessel, 3L, stainless steel | 1 |
| 2 | Adsorption Vessel, 1L, stainless steel | 1 |
| 3 | Low pressure pump | 1 |
| 4 | Distilling flask, vert, 3N, 45/50, 5L | 1 |
| 5 | Receiving flask, vert, 3N, 45/50, 3L | 1 |
| 6 | Condenser large horizontal, 45/50, 20" | 1 |
| 7 | Stopper, 45/50 | 2 |
| 8 | Wurtz distillation adapter, 45/50 | 1 |
| 9 | Distillation adapter, 45/50 | 1 |
| 10 | Condenser small vertical | 1 |
| 11 | Heating tape | 2 |
| 12 | Back loop system | 1 |
| 13 | Regulating valve | 9 |
| 14 | EV heater | 4 |
| 15 | AV heater | 2 |
| 16 | DF heater | 1 |
| 17 | RF heater | 1 |
| 18 | Thermometer | 1 |
| 19 | Thermocouples | 2 |
| 20–24 | Flat bottom 4L-flasks | 5 |

A. Packing of the Extraction 3 L-vessel (1)

The stainless steel bottom dispersion plate (with 1 mm diameter holes) was placed at the bottom of extraction vessel (1). Filter paper, cotton filter and one or more additional filter papers were placed on the dispersion plate. Approximately 1260 g of pretreated birch bark pellets were placed in the extraction vessel through the wide-neck funnel. Filter paper and the dispersion plate were then placed on top of the pellets. The extraction vessel (1) was filled with 1500 ml of p-xylene. The extraction vessel was closed/sealed with a gasket-equipped lid. The thermocouple (19.1) was inserted and the lid of vessel (1) was closed with eight bolts. The thermocouple screw was also tightened. The regulating valves (13.3) and (13.6) were attached to the top and the bottom of the extraction vessel. The stainless steel tubing was connected with the out-coming from the pump, to the top-regulating valve (13.1). The stainless steel tubing, wrapped with heating tape, was also connected to the bottom-regulating valve (13.9).

B. 2.2. Packing the Adsorption Vessel (2)

Filter paper, cotton filter and another filter paper were placed on the dispersion plate at the bottom of the adsorption vessel (2). Approximately 300 g of aluminum oxide (active acidic, activity #1, 7-230 Mesh ASTM) with 0.6 L of p-xylene was poured carefully and stirred into the adsorption vessel (4). Filter paper was placed on top of the aluminum oxide, then 400 g of dry calcinated sand, followed by another filter paper and finally a dispersion plate. The adsorption vessel (4) was closed with a lid, the thermocouple (19.2) was inserted and then the lid was tightened with twelve bolts. After tightening the lid, the thermocouple (19.2) was tightened with a screw. The regulating valve (13.4) was attached to the lid of the adsorption vessel. Stainless steel tubing was connected, out-coming from the extraction vessel, to the top-regulating valve (13.4). Stainless steel tubing was also connected from the bottom of the adsorption vessel (2) to the regulating valve (13.7).

C. Assembly of the Solvent Distillation System (4)

The coupling joint was connected to the stainless steel tubing, out-coming from the regulating valve (13.7). A 5-liter distilling flask (4) was placed into the distilling flask heater (16) and the coupling joint inserted. The Wurtz distillation adapter (8) was placed into the neck of the distilling flask. A thermometer (18) was installed into the Wurtz adapter (8). A stopper (7) was placed into the central neck of the distilling flask. The distillation adapter (9) was attached to the receiving flask and attached to a large condenser (6). The top of the large condenser (6) was adjusted to the Wurtz distillation adapter (8). The drying tube was placed on top of the small condenser (10). The extraction vessel out-coming tubing was connected to the receiving flask through the coupling joint.

D. Extraction Process

About 3500 ml of p-xylene was added to the distilling flask. The distilling flask heater was turned on. The solvent was warmed up to its boiling point. The temperature on the heating tape (11) and the heaters (14, 15) was set to about 130° C. The extraction vessel (1), adsorption vessel (2) and tubing had an average temperature of about 120–130° C. Valves 13.2 and 13.8 were closed, while valves 13.1, 13.3, 13.4, 13.6, 13.7 and 13.9 were open. When the receiving flask (5) was half filled with freshly distilled p-xylene, the pump was turned on. The pumping speed was equal to the speed of distillation (about 65–70 ml/min). The extraction was continued for about 2.5 hours and then the pump was turned off. All valves were then closed except for valve (13.5). About 1500 ml of p-xylene was distilled. The distilling flask heater was turned off. The extract ($1^{st}$-fraction) was transferred from vessel (4) to the 4 L-flat bottom flask (20). The $1^{st}$-fraction, in crystallization flask (20), was placed in a freezer to enable betulin crystallization at a temperature of about –5° C. The total volume of the $1^{st}$-fraction extract was approximately 2300 ml.

Approximately 1800 ml of p-xylene and 50 ml of acetic acid was added to the distilling flask (5). About 30 ml of acetic acid was added to the receiving flask (5). The distilling flask heater was turned on. The solvent was heated to its boiling point. The heating tape (15) and heaters (14, 15) were turned on. The temperature of the vessels and tubing was maintained at approximately 100° C. Valves 13.2 and 13.8 were closed, while valves 13.1, 13.3, 13.4, 13.6, 13.7 and 13.9 were open. Pump (3) was turned on. The pumping speed was equal to the speed of distillation (about 65–70 ml/min). The extraction was continued for 2.5 hours and the pump (3) was turned off. All valves, except valve 13.5, were closed. Approximately 1500 ml of solvent was distilled into the receiving flask (5). The distilling flask heater was turned off. The contents from the distilling flask (4) ($2^{nd}$-fraction) were transferred into the 3 L-flat bottom flask (21). Valves 13.1 and 13.8 were closed, while vales 13.2, 13.3, 13.4, 13.6, 13.7, and 13.9 were open. The nitrogen flow valve (13.2) was opened (200 ml of $N_2$/min) for 30 minutes and the residue extract was collected in the distilling flask. The flown extract was transferred to flask (21). The total volume of the $2^{nd}$-fraction extract was about 2400 ml. The distilled solvent was transferred from the receiving vessel (5) to the 3 L flat bottom flask for solvent recycling (22).

The temperature in the extraction system was maintained around 100° C. 5 L of 95% i-propanol-5% water solvent was prepared and 1500 ml was loaded in the receiving flask (5) and 3500 ml into the distilling flask (4). The distilling flask heater was then turned on. The solvent was heated to its boiling point. Valves 17.2 and 17.8 were closed, while valves 13.1, 13.3, 13.4, 13.6, 13.7 and 13.9 were opened. The pump was then turned on. The pumping speed was maintained at a level equal to the speed of distillation (about 60–70 ml/min). The extraction continued for 2.5 hours, after which, the pump was turned off and all valves, except the valve 13.5, were closed. Approximately 1500 ml of solvent was distilled into the receiving flask. The distilling flask heater was turned off. The extract ($3^{rd}$-fraction) was transferred from the distilling flask (4) into the flat bottom flask (23). Valves 13.1 and 13.8 were closed, while valves 13.2, 13.3, 13.4, 13.6, 13.7, and 13.9 were open. The nitrogen flow valve (13.2) was opened (200 ml/min) for 30 min. The flown extract was collected in vessel (4) and transferred to flask (23). The total volume of the $3^{rd}$-fraction extract was approximately 2200 ml. The distilled solvent from the receiving vessel (5) was transferred into the flask for solvent recycling (24).

Step 3: Birch Bark Triterpenes Isolation

A. Betulin Isolation

The $1^{st}$ fraction solution (2.3 L from flask 20) was cooled down at a temperature of about –5° C. in a freezer for about 4 hours. The white precipitate was then filtered using a Buchner funnel 600 ml and Bunzen flask 4 L. The crystals in the funnel were washed with p-xylene (2×100 ml) at a temperature of approximately 5–10° C. The white crystals were dried in vacuum at a temperature of about 90° C. up to the constant weight. About 145 g of 98%$^+$ pure betulin was obtained (gas chromatography (GC), high performance liquid chromatography (HPLC)). The yield of betulin from starting birch bark pellets was about 12%.

B. Lupeol Isolation

The liquid portion (about 2500 ml) remaining after betulin filtration was evaporated under reduced pressure in a rotor evaporator. About 32–35 g of dry material was crystallized twice with dry acetone. The white crystals of lupeol were then dried in vacuum up to the constant weight. Approximately 14.6 g of 95%$^+$ pure lupeol was obtained (GC, HPLC). The yield of 95%$^+$ pure lupeol from starting birch bark pellets was about 1.2%.

C. Betulinic Acid Isolation

The $2^{nd}$-fraction solution (2.4 L from flask 22) was evaporated under reduced pressure to obtain 27 g of a dark colored betulinic acid fraction containing about 60% betulinic acid, as determined by HPLC analysis. The fraction containing approximately 60% of betulinic acid, approximately 27 g, was boiled with 400 ml of isopropanol and 4.2 g of sodium hydroxide for about 2 hours. The solution was cooled to a temperature of about 40° C. and the isopropanol was evaporated under reduced pressure. The remaining solid material was transferred into the Soxlet apparatus and extracted with 300 ml of p-xylene for 3 hours. The solid material was dried under vacuum and transferred to a 1 L beaker to which 700 ml of water was added and stirred at about 1000 rpm for about 1 h. The precipitate was filtered and washed with about 100 ml of 5% sodium hydroxide (pH>10). The remaining solid material was transferred into a 1 L beaker to which 300 ml of water was added and acidified with approximately 5% hydrochloric acid (pH=5.2–5.5). The precipitate was filtered and dried on a filter. The dried precipitate was then crystallized twice from i-propanol. Approximately 12 g of 95%$^+$ pure betulinic acid was obtained (GC, HPLC). The yield of betulinic acid from starting birch bark pellets was approximately 1.0%.

C. Betulin 3-caffeate Isolation

The $3^{rd}$-fraction solution (2.2 L, flask 23) of the crystallization flask was evaporated under reduced pressure. Approximately 47 g of a brown betulin-3-caffeate fraction, which contains 48% betulin-3-caffeate by HPLC analysis, was obtained. About 15 g of betulin-3-caffeate was obtained (93%$^+$ pure, HPLC, nuclear magnetic resonance (NMR)) by column chromatography on silica with ether/hexane=6/4. The yield of betulin-3-caffeate from starting birch bark pellets was about 1.25%.

All publications, patents and patent applications are incorporated herein by reference. While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A method for selectively extracting one or more of betulin and lupeol from plant tissue in the presence of one or more of betulin acid and betulin-3-caffeate,
    wherein the plant tissue comprises plant tissue from a tree of the genus *Betula*; the method comprising:
    (a) contacting a mixture of a metal alcoholate or a metal hydroxide component and an optionally substituted aromatic solvent with the plant tissue to immobilize the betulin acid and betulin-3-caffeate as a salt on the plant tissue; and
    (b) contacting the plant tissue with an optionally substituted cyclic, linear, or branched alcoholic solvent suitable to remove the one or more of betulin and lupeol; thereby effectively providing a solution comprising the one or more of betulin and lupeol.

2. The method of claim 1, wherein the metal alcoholate is an aluminum alcoholate.

3. The method of claim 2, wherein the aluminum alcoholate is aluminum iso-propoxide.

4. The method of claim 2 wherein the aluminum alcoholate is aluminum ethoxide or aluminum methoxide.

5. The method of claim 1 wherein the metal hydroxide component comprises an alkali metal hydroxide or an alkaline earth metal hydroxide.

6. The method of claim 5 wherein the basic component is NaOH, KOH, LiOH, $Mg(OH)_2$, $Ca(OH)_2$, or a mixture thereof.

7. The method of claim 1 wherein the contacting the mixture with plant tissue further comprises employing an alkaline earth metal oxide.

8. The method of claim 1, wherein the optionally substituted aromatic solvent is substituted with one or more $(C_1–C_6)$alkyl, hydroxyl, halo, cyano, nitro, oxo, thioxo, amino, carboxyl, or combinations thereof.

9. The method of claim 1, wherein the optionally substituted aromatic solvent is toluene, o-xylene, m-xylene, p-xylene, or a combination thereof.

10. The method of claim 1, wherein the optionally substituted aromatic solvent, the optionally substituted cyclic, linear, or branched alcoholic solvent, or a combination thereof, comprises an additive.

11. The method of claim 10 wherein the additive is methanol; ethanol; 1-propanol; 2-propanol; 1-hexanol; 2-methoxy ethanol; tetrahydrofuran; 1,4-dioxane; acetonitrile; dichloromethane; ammonia; chloroform; propylene carbonate; N,N-dimethylacetamide; dimethyl sulfoxide; formic acid; water; carbon disulfide; acetone; propane; toluene; hexanes; pentanes; o-xylene; m-xylene; p-xylene; toluene; or a combination thereof.

12. The method of claim 1 wherein the plant tissue comprises bark, roots, leaves, flowers, needles, bulbs, berries, rhizomes, rootstocks, stems, seeds, or any combination thereof.

13. The method of claim 1 wherein the plant tissue comprises *Betula alba* bark, *Betula lenta* bark, *Betula maximowicziana* bark, *Betula nana* bark, *Betula platyphyla japonica* bark, *Betula pubescens* bark, *Betula alleghaniensis* bark, *Betula papyrifera* bark, *Betula populifolia* bark, *Betula nigra* bark, *Betula pendula* bark, or a combination thereof.

14. The method of claim 1 wherein the one or more of betulin and lupeol obtained in the selective extraction comprises less than about 5 wt. % betulin acid and betulin-3-caffeate.

15. The method of claim 1, further comprising contacting the plant tissue with an acid in a third solvent, to neutralize the salt and to remove the one or more of betulin acid and betulin-3-caffeate from the plant tissue.

16. The method of claim 15 wherein the acid comprises hydrochloric acid, hydrobromic acid, sulfuric acid, phosphoric acid, acetic acid, formic acid, or a combination thereof.

17. The method of claim 15, wherein the third solvent comprises an optionally substituted aromatic compound, an optionally substituted heterocyclic compound, an optionally substituted cyclic compound, an optionally substituted linear or branched compound, or combination thereof, wherein suitable substituents include $(C_1–C_6)$alkyl, hydroxyl, halo, cyano, nitro, oxo, thioxo, amino, carboxyl, or combinations thereof.

18. The method of claim 15, wherein the third solvent comprises isopropanol, ethanol, methanol, methylene chloride, toluene, o-xylene, m-xylene, p-xylene, carbon dioxide, Xe, Freon-23, ethane, $N_2O$, $SF_6$, propane, ammonia, $n-C_4H_{10}$, $(C_2H_5)_2O$, or a combination thereof.

19. The method of claim 15, wherein the third solvent comprises an additive.

20. The method of claim 19 wherein the additive is methanol; ethanol; 1-propanol; 2-propanol; 1-hexanol; 2-methoxy ethanol; tetrahydrofuran; 1,4-dioxane; acetonitrile; dichloromethane; ammonia; chloroform; propylene carbonate; N,N-dimethylacetamide; dimethyl sulfoxide; formic acid; water; carbon disulfide; acetone; propane; toluene; hexanes; pentanes; o-xylene; m-xylene; p-xylene; toluene; or a combination thereof.

21. The method of claim 15 wherein the one or more of betulin acid and betulin-3-caffeate obtained from the selective extraction comprises less than about 5 wt. % betulin and lupeol.

22. The method of claim 1, wherein the metal of the metal alcoholate or metal hydroxide is lithium, sodium, potassium, magnesium, calcium, or germanium.

23. The method of claim 1, wherein the metal alcoholate or metal hydroxide is a compound of the formula:

$$M(O—R)_n,$$

wherein

M is lithium, sodium, potassium, magnesium, calcium, or germanium;

each R is independently H, $(C_1–C_{12})$alkyl, aryl, or arylalkyl, wherein each alkyl, aryl, or arylalkyl can be optionally substituted on carbon with one or more hydroxy, halo, or $—N(R_b)_2$; wherein $R_b$ is H, $(C_1–C_6)$ alkyl, aryl, or arylalkyl; and n is 1, 2, or 3.

24. The method of claim 1, wherein the metal alcoholate is sodium methoxide, sodium ethoxide, potassium ethoxide, potassium tert-butoxide, or dimethoxymagnesium.

25. The method of claim 1, wherein the optionally substituted cyclic, linear, or branched alcoholic solvent is optionally substituted with one or more $(C_1–C_6)$alkyl, halo, cyano, nitro, oxo, thioxo, amino, carboxyl, or combinations thereof.

26. The method of claim 1, wherein the optionally substituted cyclic, linear or branched alcoholic solvent is methanol, ethanol, 1-propanol, 2-propanol, 1-hexanol, 2-methoxy ethanol, or a combination thereof.

27. A method for selectively extracting one or more of betulin and lupeol from plant tissue in the presence of one or more of betulin acid and betulin-3-caffeate, the method comprising:

(a) contacting the plant tissue with an aluminum alkoxide and an optionally substituted aromatic solvent to immobilize the one or more of betulin acid and betulin-3-caffeate as a salt on the plant tissue; and (b) contacting the plant tissue with an optionally substituted cyclic, linear, or branched alcoholic solvent suitable to remove the one or more of betulin and lupeol; thereby effectively providing a solution comprising the one or more of betulin and lupeol.

28. The method of claim 27, further comprising treating the plant tissue with an acid in a third solvent to provide a solution comprising the one or more of betulin acid and betulin-3-caffeate.

29. A method for selectively extracting lupeol, betulin, or a combination thereof from birch bark in the presence of betulinic acid, betulin-3-caffeate, or a combination thereof, the method comprising:

(a) contacting the birch bark with an aluminum alkoxide and an optionally substituted aromatic solvent comprising toluene thereby effectively immobilizing the betulinic acid, betulin-3-caffeate, or combination thereof as a salt on the birch bark; and (b) contacting the birch bark with an optionally substituted cyclic, linear, or branched alcoholic solvent suitable to remove the lupeol, betulin, or combination thereof.

30. The method of claim 29, further comprising treating the birch bark with an acid in a third solvent to provide the betulinic acid, betulin-3-caffeate, or combination thereof.

31. The method of claim 30, wherein the third solvent comprises an optionally substituted aromatic compound, an optionally substituted heterocyclic compound, an optionally substituted cyclic compound, an optionally substituted linear or branched compound, or combination thereof, wherein suitable substituents include $(C_1–C_6)$alkyl, hydroxyl, halo, cyano, nitro, oxo, thioxo, amino, carboxyl, or combinations thereof.

32. The method of claim 30, wherein the third solvent comprises isopropanol, ethanol, methanol, methylene chloride, toluene, o-xylene, m-xylene, p-xylene, carbon dioxide, Xe, Freon-23, ethane, $N_2O$, $SF_6$, propane, ammonia, $n-C_4H_{10}$, $(C_2H_5)_2O$, or a combination thereof.

33. The method of claim 30, wherein the third solvent comprises an additive.

34. The method of claim 33 wherein the additive is methanol; ethanol; 1-propanol; 2-propanol; 1-hexanol; 2-methoxy ethanol; tetrahydrofuran; 1,4-dioxane; acetonitrile; dichloromethane; ammonia; chloroform; propylene carbonate; N,N-dimethylacetamide; dimethyl sulfoxide; formic acid; water; carbon disulfide; acetone; propane; toluene; hexanes; pentanes; o-xylene; m-xylene; p-xylene; toluene; or a combination thereof.

* * * * *